(12) United States Patent
Sasaki et al.

(10) Patent No.: US 8,051,942 B2
(45) Date of Patent: Nov. 8, 2011

(54) STEERING SYSTEM (75) Inventors: Hiroaki Sasaki, Wako (JP); Yutaka Horiuchi, Wako (JP); Takashi Yanagi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 12/326,365

(22) Filed: Dec. 2, 2008

(65) Prior Publication Data
US 2009/0140502 A1 Jun. 4, 2009

(30) Foreign Application Priority Data

Dec. 3, 2007 (JP) .................................. 2007-312376

(51) Int. Cl.
*B62D 5/06* (2006.01)
(52) U.S. Cl. .......................... 180/410; 701/37; 280/5.52
(58) Field of Classification Search .................. 180/410; 280/5.52, 5.522, 5.521, 86.758, 5.5, 86.757; 701/37

See application file for complete search history.

(56) References Cited

U.S. PATENT DOCUMENTS

| | | | | |
|---|---|---|---|---|
| 2,202,665 A | * | 5/1940 | Metz, Sr. | 280/124.126 |
| 4,835,714 A | * | 5/1989 | Sano et al. | 700/279 |
| 4,971,348 A | * | 11/1990 | Oyama et al. | 280/5.521 |
| 5,303,791 A | * | 4/1994 | Hayashi et al. | 180/445 |
| 5,481,458 A | * | 1/1996 | Harara et al. | 701/37 |
| 5,557,525 A | * | 9/1996 | Miichi et al. | 701/29 |
| 6,279,920 B1 | * | 8/2001 | Choudhery | 280/5.521 |
| 7,516,965 B2 | * | 4/2009 | Horiuchi | 280/5.52 |
| 7,673,883 B2 | * | 3/2010 | Damm | 280/5.521 |

FOREIGN PATENT DOCUMENTS

| | | |
|---|---|---|
| EP | 0 512 591 | 11/1992 |
| EP | 1 975 041 | 10/2008 |
| JP | 04-310468 | 11/1992 |
| JP | 6-47388 | 6/1994 |
| JP | 2001-080538 A | 3/2001 |
| JP | 2006-103469 A | 4/2006 |

* cited by examiner

*Primary Examiner* — Paul N Dickson
*Assistant Examiner* — Tashiana Adams
(74) *Attorney, Agent, or Firm* — Rankin, Hill & Clark LLP (57) ABSTRACT

The present invention improves response characteristics in turning traveling of a vehicle while traveling stability at the time of turning is kept. The present invention provides a system in which toe angles of left and right rear wheels are controlled based on a steering angular velocity, not a steering angle of a steering. In a steering system in which toe angles of left and right rear wheels are controlled independently, a steering angular velocity is calculated from a steering angle, and toe angle changers are controlled to tilt the toe angle of the right rear wheel to the left when the steering angular velocity is on the left side, and is controlled to tilt the toe angle of the left rear wheel to the left when the steering angular velocity is on the right side.

4 Claims, 8 Drawing Sheets

STEERING SYSTEM

CROSS REFERENCE TO RELATED APPLICATIONS

The present application claims benefit of the filing date of Japanese Patent Application No. 2007-312376 filed on Dec. 3, 2007 which is incorporated herein by reference.

FIELD OF THE INVENTION

The present invention relates to a steering system for controlling toe angles of left and right rear wheels of a four-wheeled vehicle independently.

DESCRIPTION OF THE RELATED ART

In the prior art, in order to improve turning characteristics, a variety of four-wheel steering apparatuses for controlling toe angles of rear wheels have been proposed. For example, in JP 06-047388 B (1994), the fact that the toe angles of left and right rear wheels are controlled independently based on a steering angle of a steering wheel and a vehicle speed.

However, as described in JP 06-047388 B (1994), controlling the toe angles of the left and right rear wheels based on the steering angle of the steering wheel (setting aside the vehicle speed) causes degradation in response characteristics of a vehicle in turning traveling.

For example, considering slalom traveling, controlling based on a steering angle causes delay in response characteristics of turning traveling. However, trying not to cause delay in response characteristics can impair stability.

In view of the foregoing, an object of the present invention is to improve response characteristics in turning traveling of a vehicle while traveling stability at the time of turning is kept.

SUMMARY OF THE INVENTION

In order to achieve the above object, the present invention provides a system in which toe angles of left and right rear wheels are controlled based on a velocity of steering angle of a steering wheel (i.e., a steering angular velocity), not a steering angle of a steering.

When a turning status is going to change, at the time of turning a steering wheel, (even if the direction of front wheels remains unchanged) the direction of the steering angular velocity has been changed. As a result, when the toe angles of the left and right rear wheels are controlled based on the steering angular velocity of the steering wheel, the toe angle becomes to be controlled at the beginning of changing of the steering angular velocity. At this time, the direction of the rear wheel, which does not significantly affect turning characteristics when the rear wheel becomes an inner wheel, and significantly affects turning characteristics when the rear wheel becomes an outer wheel, is changed to be toe-in so as to control the toe angle. That is, the inner wheel, which less affects turning characteristics than the outer wheel, is controlled in advance.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

Figure 1:
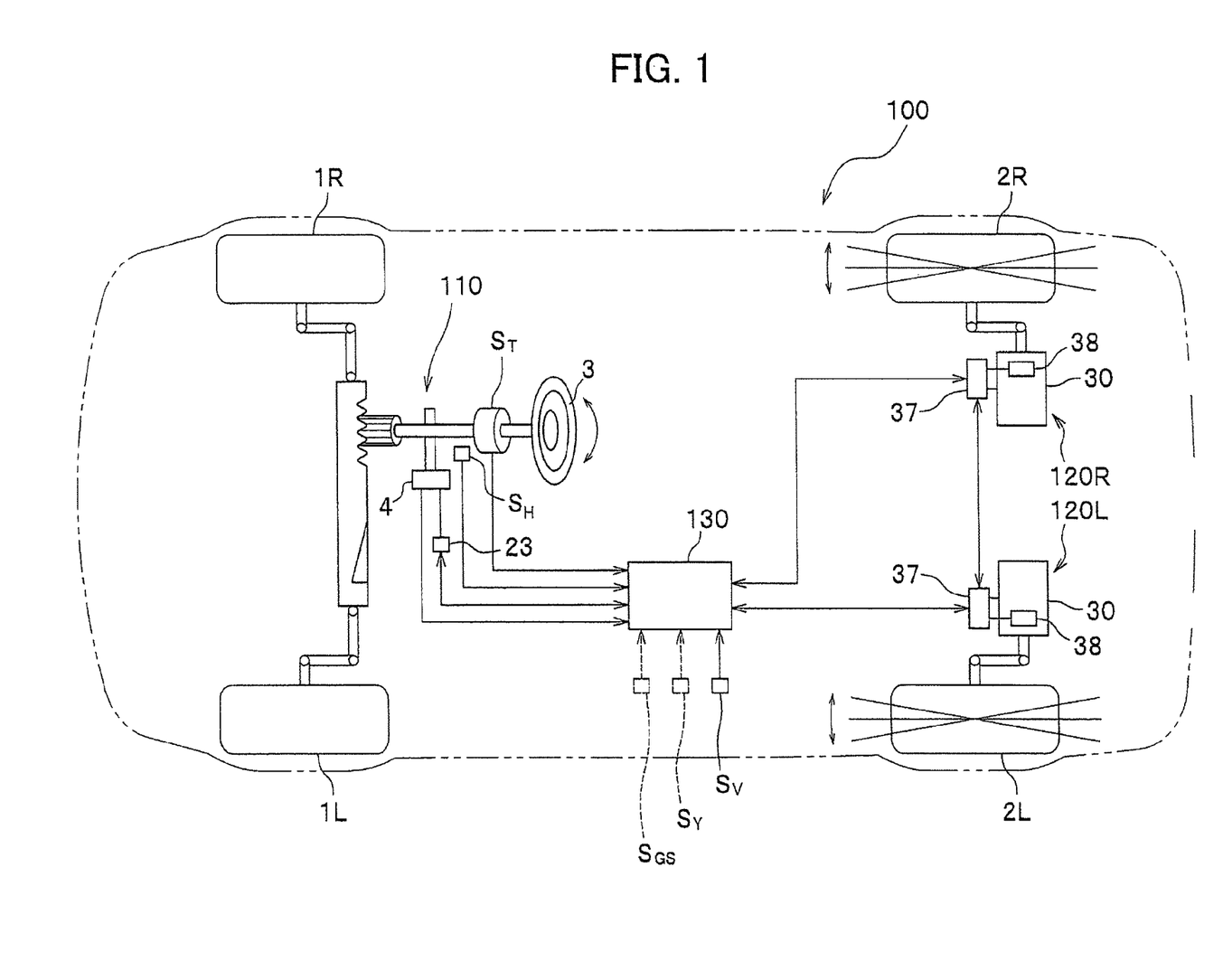
FIG. 1 is a schematic diagram of an entire four-wheel vehicle having a toe angle changer according to an embodiment of the present invention.
Figure 2:
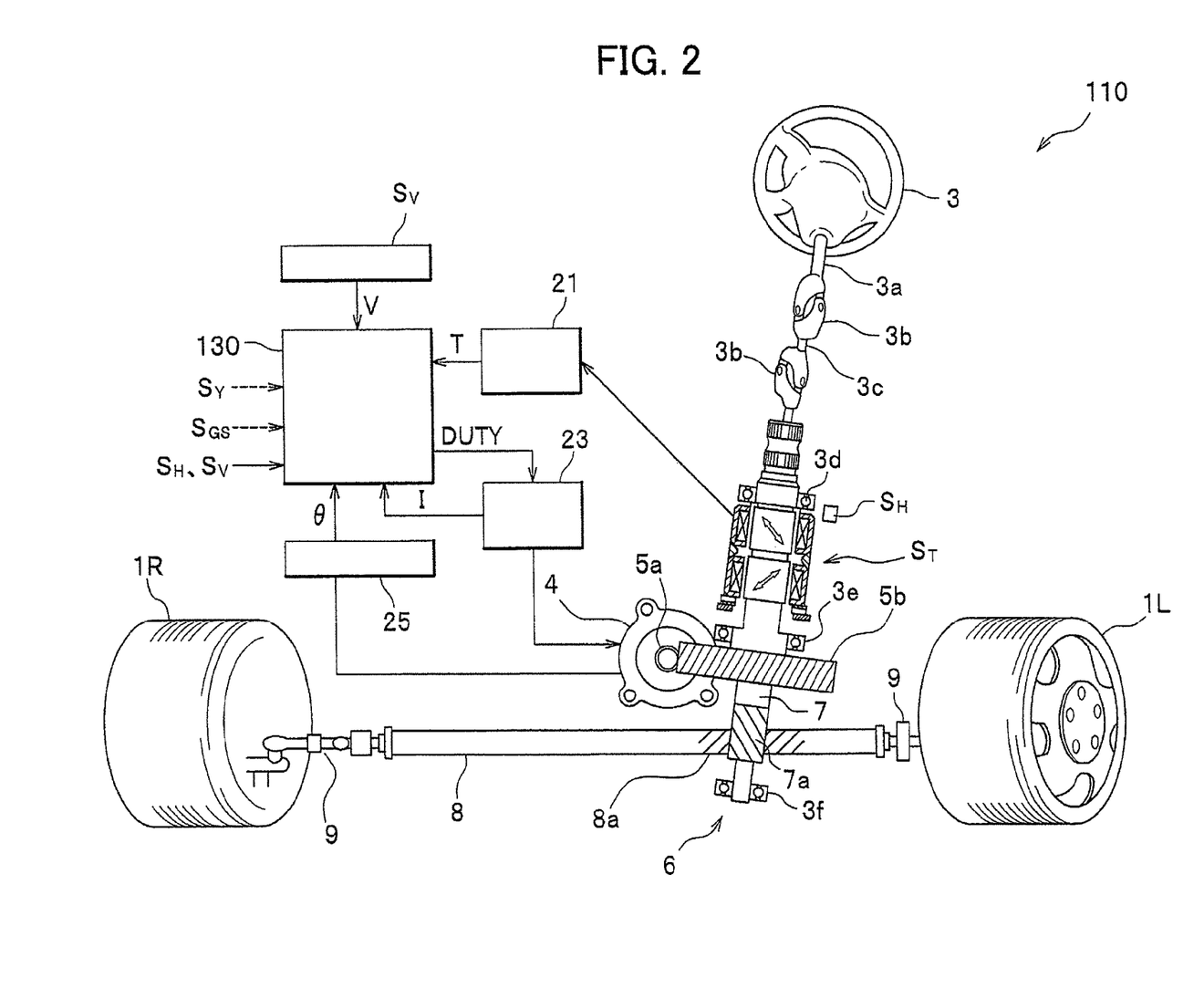
FIG. 2 is a diagram of an electric power steering device in the steering system.

Hereinafter, a best mode for carrying out the invention (hereinafter, an "embodiment") will be explained. In the explanation, the attached drawings will be referred to. In addition, FIG. 1 is a schematic diagram of an entire four-wheel vehicle having a toe angle changer according to an embodiment of the present invention. FIG. 2 is a diagram of an electric power steering device.

<Construction>

As shown in FIG. 1, a steering system 100 includes an electric power steering device 110 having an electric motor 4, which is configured to assist steering of left and right front wheels 1L, 1R by a steering wheel 3, and toe angle changers 120L, 120R configured to independently change toe angles of rear wheels 2L, 2R by respective actuators 30, in accordance with a steering angle of the steering wheel 3 and a vehicle speed. The steering system 100 further includes a steering controller 130 (hereinafter, referred to as "steering control ECU (Electronic Control Unit)") configured to control the electric power steering device 110 and the toe angle changers 120L, 120R, and various sensors, including a steering angle sensor $S_H$, and a vehicle speed sensor $S_V$.

(Electric Power Steering Device)

The electric power steering device 110 includes, as shown in FIG. 2, the steering wheel 3, a main steering shaft 3a attached thereto, a shaft 3c and a pinion shaft 7, which shafts are connected through two universal joints 3b. The pinion shaft 7 has a pinion gear 7a provided on a lower end of the pinion shaft 7, which engages with rack teeth 8a of a rack shaft 8 which can reciprocate in a vehicle width direction. To respective ends of the rack shaft 8, the left front wheel 1L and the right front wheel 1R are connected through tie rods 9, 9. With this configuration, the electric power steering device 110 can change traveling direction of the vehicle by the operation of the steering wheel 3. Herein, the rack shaft 8, the rack teeth 8a and the tie rods 9, 9 constitute a steering wheel turn mechanism.

It should be noted that the pinion shaft 7 is supported by a steering gear box 6. Additionally, an upper portion, a middle portion and a lower portion of the pinion shaft 7 are supported through bearings 3d, 3e and 3f, respectively.

The electric power steering device 110 also has the electric motor 4 for supplying an auxiliary steering effort to reduce a steering effort required at the steering wheel 3. The electric motor 4 has an output shaft with a worm gear 5a which engages with a worm wheel gear 5b provided on the pinion shaft 7.

In other words, the worm gear 5a and the worm wheel gear 5b constitute a deceleration mechanism. In addition, a rotor (not shown) of the electric motor 4, and the components connected to the electric motor 4, such as the worm gear 5a, the worm wheel gear 5b, the pinion shaft 7, the rack shaft 8, the rack teeth 8a and the tie rods 9, 9, constitute a steering unit.

The electric motor 4 is a three-phase brushless motor formed of a stator (not shown) with a plurality of field coils as well as the rotor which rotates in the stator, for converting electric energy to kinetic energy.

In addition, the electric power steering device 110 also includes an electric motor drive circuit 23 configured to drive the electric motor 4, a resolver 25 configured to detect (measure) a rotation angle of the electric motor 4, and a torque sensor $S_T$ configured to detect (measure) a pinion torque applied to the pinion shaft 7. The electric power steering device 110 further includes a steering angle sensor $S_H$ configured to detect (measure) a rotation angle of the pinion shaft 7, a differential amplifier 21 configured to amplify the output from the torque sensor $S_T$, and the vehicle speed sensor $S_V$ configured to detect (measure) a vehicle speed.

The electric motor steering control ECU 130 of the steering system 100 has an electric power steering control part 130a (which will be described below; see FIG. 5) as a functional part of the electric power steering device 110, which controls the driving of the electric motor 4.

The electric motor drive circuit 23 has switching elements, such as three-phase FET (Field Effect Transistor) bridge circuit, and is configured to generate a square-wave voltage based on duty signals (DU, DV, DW) [PWM (Pulse Width Modulation) signals] from the electric power steering control part 130a (see FIG. 5), to thereby drive the electric motor 4.

The electric motor drive circuit 23 also has a function to detect (measure) a three-phase electric motor current I using a Hall element (not shown).

The vehicle speed sensor $S_V$ is configured to detect (measure) the vehicle speed V as a pulse number per unit time, and to output a vehicle speed signal.

The functional configuration of the steering control ECU 130 will be described later, together with the control by the electric power steering device 110 and the control by the toe angle changers 120L, 120R.

(Toe Angle Changer)

Next, a configuration of the toe angle changer will be described with reference to FIGS. 3 and 4.

Figure 3:
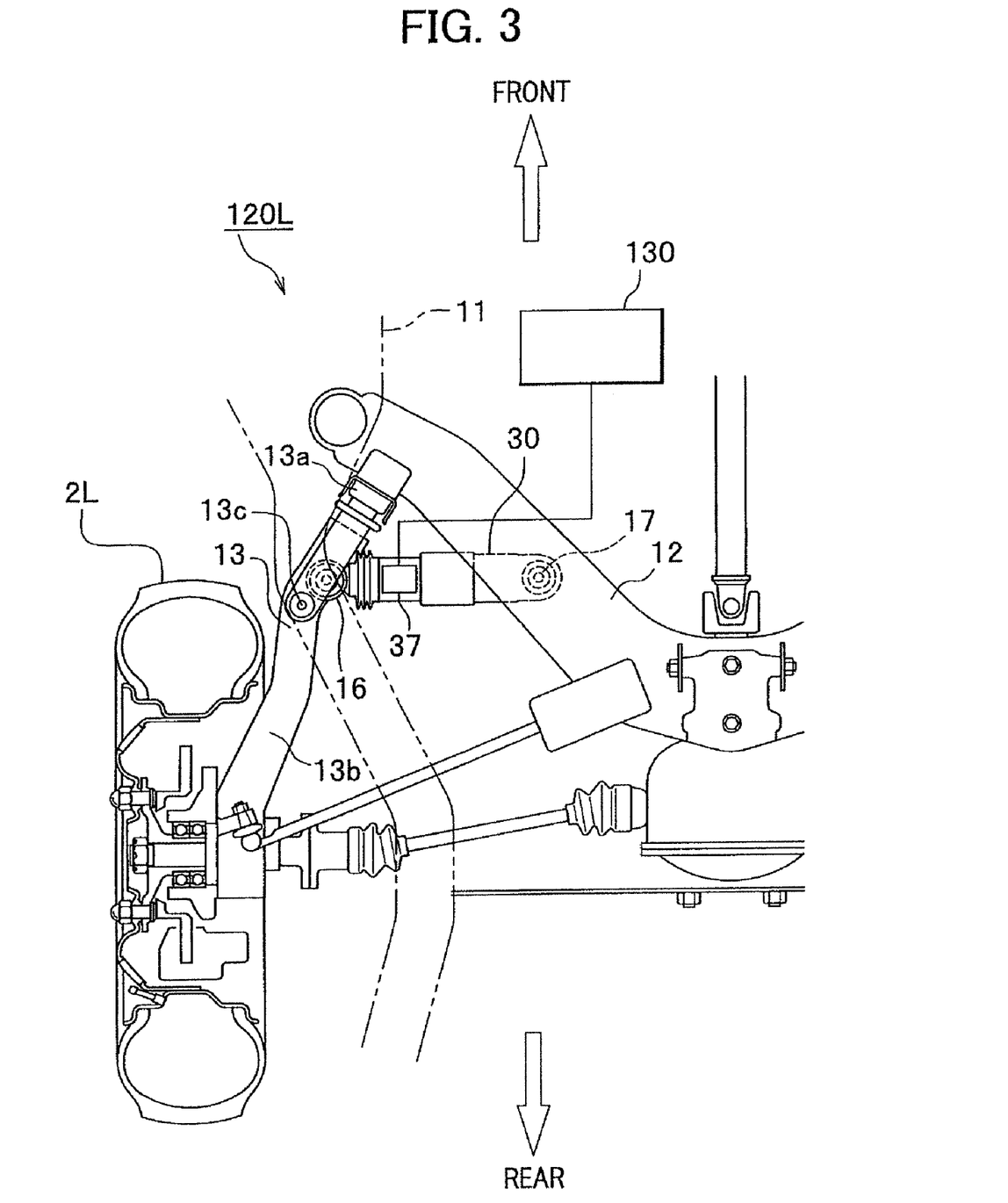
FIG. 3 is a diagram of a toe angle changer on a left rear wheel side in the steering system.

FIG. 3 is a plain view of a toe angle changer on a left rear wheel side. FIG. 4 is a schematic cross sectional view showing a structure of an actuator of a toe angle changer.

The toe angle changers 120L, 120R are installed to the left rear wheel 2L and the right rear wheel 2R of the vehicle, respectively. The toe angle changer 120L is taken as an example, and the left rear wheel 2L is shown in FIG. 3. The toe angle changer 120L includes the actuator 30 and a toe angle change controller (hereinafter, referred to as "toe angle change control ECU") 37.

It should be noted that FIG. 3 shows the left rear wheel 2L only, but the components are arranged in the same manner (symmetrically) on the right rear wheel 2R. It is also noted that the toe angle change control ECU 37 constitutes the controller of the toe angle changer.

The cross member 12 extends substantially in the vehicle width direction, and end portions (in terms of the vehicle width direction) thereof are elastically supported by a rear side frame 11 of the vehicle body. A trailing arm 13 extends substantially in the front-rear direction of the vehicle body, and a front end portion thereof is supported by a portion near the terminal (in terms of the vehicle width direction) of the cross member 12. The rear wheel 2L is fixed to a rear end portion of the trailing arm 13.

The trailing arm 13 is formed of a vehicle body-side arm 13a attached to the cross member 12, and a wheel-side arm 13b fixed to the rear wheel 2L, which are connected to each other through a nearly vertical rotation axis 13c. With this configuration, the trailing arm 13 is displaceable in the vehicle width direction.

With respect to the actuator 30, one end portion is attached through a bush 16 to a front end portion of the wheel-side arm 13b relative to the rotation axis 13c, and the other end (base end) portion of the actuator 30 is fixed to the cross member 12 through a bush 17.

Figure 4:
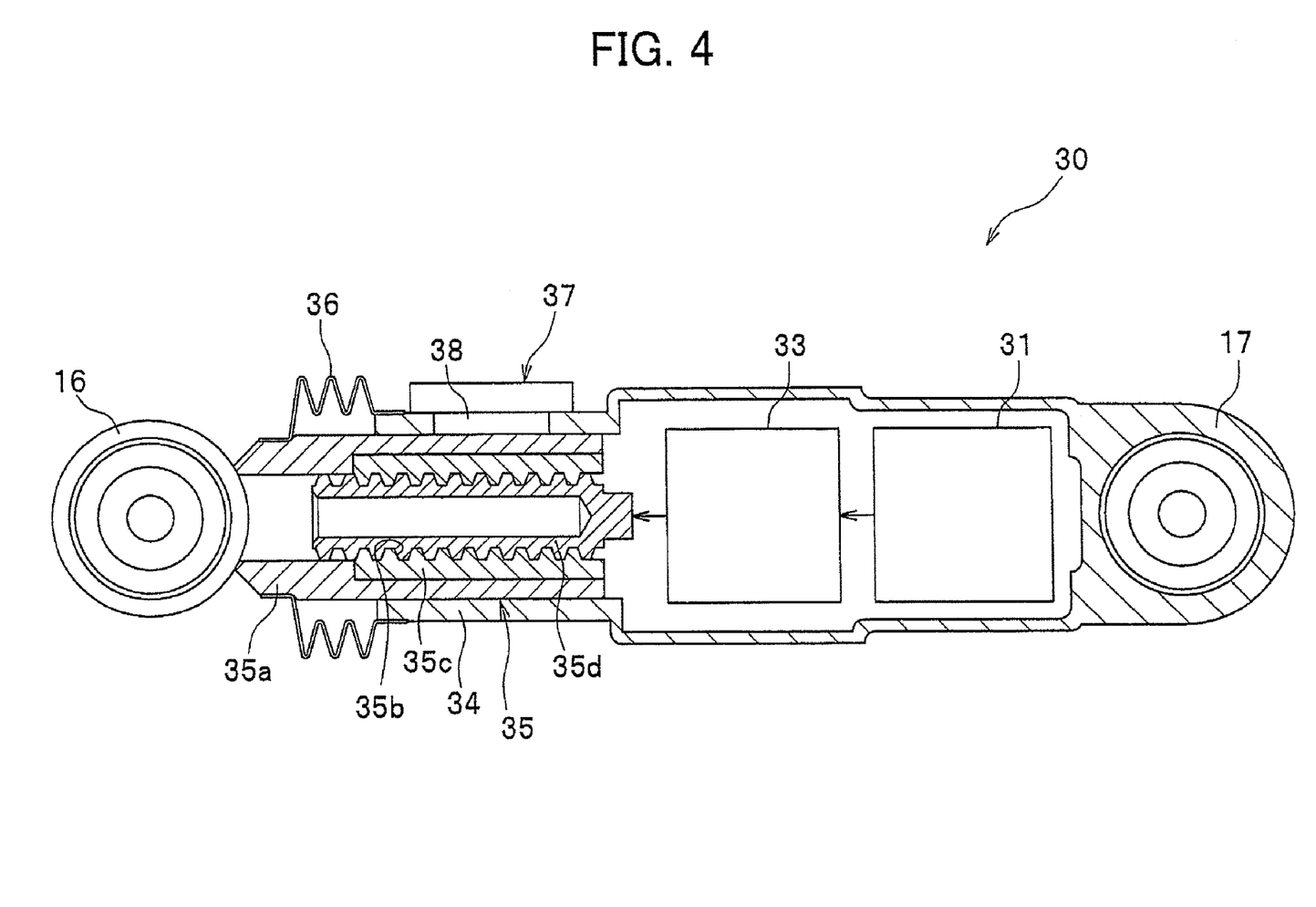
FIG. 4 is a schematic cross sectional view showing a structure of an actuator of a toe angle changer.

As shown in FIG. 4, the actuator 30 includes an electric motor 31, a deceleration mechanism 33, a feed screw portion 35 and the like.

The electric motor 31 may be a brush motor, a brushless motor or the like, which can rotate in both forward and reverse directions.

The deceleration mechanism 33 is formed of, for example, double planetary gears (not shown) or the like assembled therein.

The feed screw portion 35 includes: a rod 35a in a shape of a cylinder; a nut 35c in a shape of a cylinder which has an internal thread 35b formed in an inner periphery thereof and is inserted in the rod 35a; and a screw shaft 35d which engages with the internal thread 35b and supports the rod 35a in such a manner that the rod 35a is movable in an axial direction.

The feed screw portion 35, the deceleration mechanism 33 and the electric motor 31 are encased in a case body 34 in an elongated cylinder shape. To a portion of the case body 34 on a feed screw portion 35 side, a boot 36 is attached so as to cover both an end portion of the case body 34 and an end portion of the rod 35a, in order to prevent dust or foreign matter from attaching to an outer periphery of the rod 35a exposed from the end portion of the case body 34, and to prevent dust, foreign matter or water from entering the case body 34.

One end portion of the deceleration mechanism 33 is connected to an output shaft of the electric motor 31, and the other end portion is connected to the screw shaft 35d. When the power of the electric motor 31 is transmitted through the deceleration mechanism 33 to the screw shaft 35d to rotate the screw shaft 35d, the rod 35a shifts in a right-left direction in the drawing (axial direction) relative to the case body 34, and thus the actuator 30 contracts or expands. Due to the frictional force caused by engagement of the screw shaft 35d and the internal thread 35b of the nut 35c, a toe angle of the rear wheel is maintained constant, even when the electric motor 31 is not energized and driven.

The actuator 30 also includes a stroke sensor 38 configured to detect (measure) the position of the rod 35a (i.e., amount of expansion/contraction). In the stroke sensor 38, a magnet or the like is embedded so as to detect (measure) the location of the rod 35a by utilizing magnetism. In this manner, by detecting the position of the rod 35a using the stroke sensor 38, the steering angles (toe angle) of toe-in or toe-out of the rear wheels 2L, 2R are separately detected with high accuracy.

With the actuator 30 having the configuration as described above, the bush 16 provided on an end portion of the rod 35a is rotatably connected to the wheel-side arm 13b of the trailing arm 13 (see FIG. 3), and the bush 17 provided on the base end of the case body 34 (right-hand end in FIG. 4) is rotatably connected to the cross member 12 (see FIG. 3). When the power of the electric motor 31 rotates the screw shaft 35d and the rod 35a shifts leftward (in FIG. 4) (i.e., the actuator 30 expands), the wheel-side arm 13b is pushed outward in the vehicle width direction (left direction in FIG. 3) to thereby leftward turn the rear wheel 2L. On the other hand, when the rod 35a shift rightward (in FIG. 4) (i.e., the actuator 30 contracts), the wheel-side arm 13b is pulled inward in the vehicle width direction (right direction in FIG. 3) to thereby rightward turn the rear wheel 2L.

It should be noted that the position to which the bush 16 of the actuator 30 is attached is not limited to the wheel-side arm 13b and the actuator 30 can be attached to any position, such as on a knuckle arm, as long as the toe angle of the rear wheel 2L can be changed. In addition, in the present embodiment, the toe angle changers 120L, 120R are applied to an independent suspension system with semi-trailing arms. However, the present invention is not limited to this type of suspension system, and may be applied to other types of suspension system.

For example, the actuator 30 may be introduced to a side rod of a double wishbone type suspension, or a side rod of a strut type suspension.

In addition, the toe angle change control ECU 37 is unified with the actuator 30. The toe angle change control ECU 37 is fixed to the case body 34 of the actuator 30, and connected to the stroke sensor 38 through connectors or the like. Between two toe angle change control ECUs 37, 37, and between the toe angle change control ECU 37 and the steering control ECU 130, there are provided signal circuits connecting them to each other.

To the toe angle change control ECU 37, power is supplied from a power source (not shown), such as a battery, mounted on a vehicle. Also to the steering control ECU 130 and the electric motor drive circuit 23, power is supplied from a power source (not shown), such as battery, which is an independent system of that of the toe angle change control ECU 37.

(Steering Control ECU)

Next, functions of the steering control ECU will be described with reference to FIG. 5.

Figure 5:
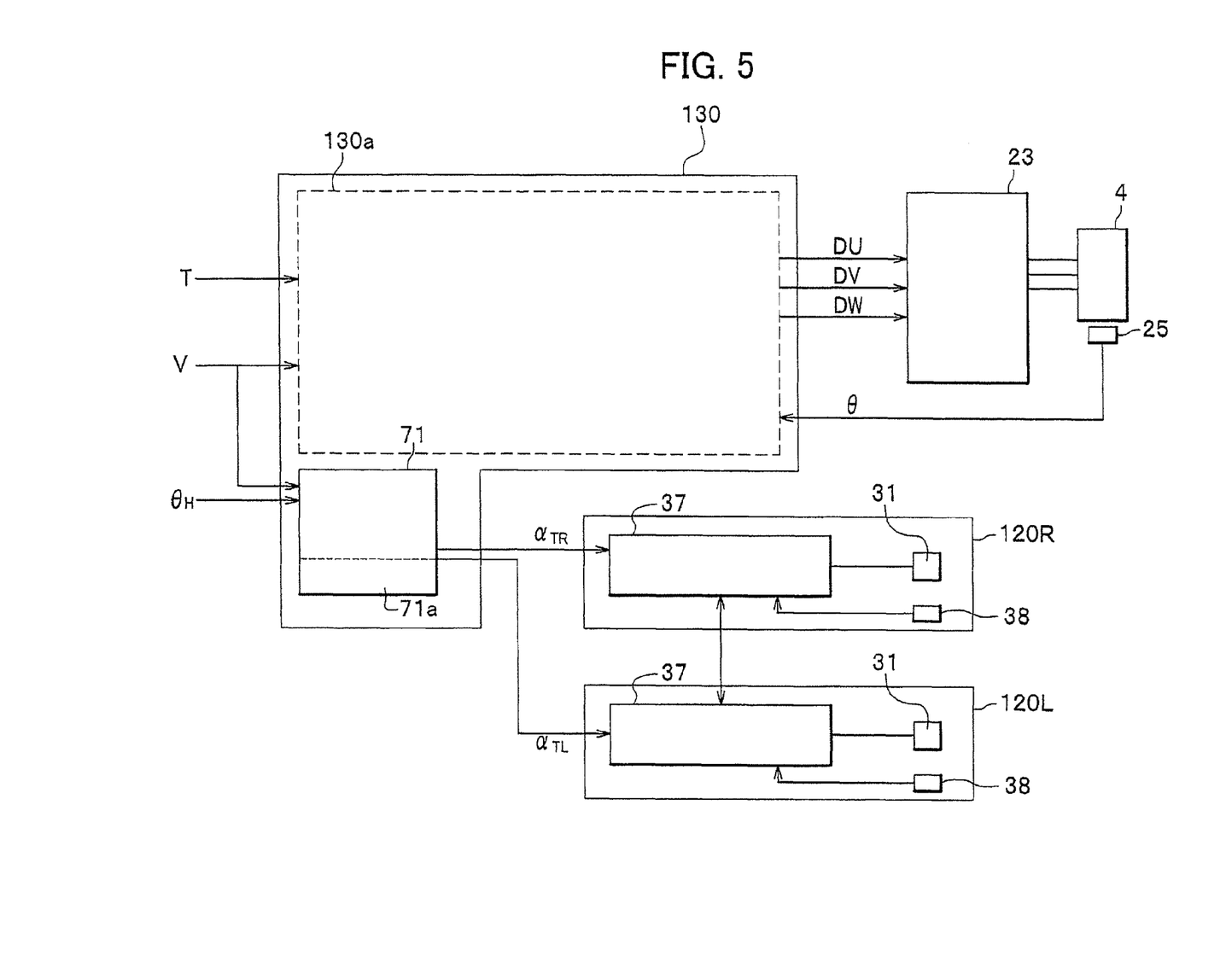
FIG. 5 is a schematic diagram of a control function of a steering control ECU and toe angle changers in the steering system.

FIG. 5 is a schematic diagram of a control function of a steering control ECU and toe angle changers in the steering system.

The steering control ECU 130 includes a microcomputer with components, such as CPU (Central Processing Unit), ROM (Read Only Memory), RAM (Random Access Memory) (not shown), and a peripheral circuit and the like.

As shown in FIG. 5, the steering control ECU 130 includes: the electric power steering control part 130a configured to control the electric power steering device 110; and a target toe angle computing part 71 configured to compute target toe angles of the rear wheels 2L, 2R.

(Electric Power Steering Control Part)

Although a detailed description thereof is omitted, an electric power steering control part 130a sets a target current signal to drive control an electric motor 4 as shown in FIG. 2 of JP 2002-059855 A, inertia compensates the target current signal, further damper compensates the target current signal, and outputs duty signals (DU, DV, DW) to an electric motor drive circuit 23 by feedback controlling the compensated target signal with the output signals of the electric motor drive circuit.

(Target Toe Angle Computing Part)

Next, a target toe angle computing part will be described with reference to FIG. 5.

The target toe angle computing part 71 primarily generates target toe angles $\alpha_{TL}$, $\alpha_{TR}$ for left and right rear wheels 2L, 2R from a steering angular velocity $\omega_H$ of a steering angle $\theta_H$, and inputs the target toe angles $\alpha_{TL}$, $\alpha_{TR}$ to the toe angle change control ECU 37, 37 for controlling changes in toe angles of the left and right rear wheels 2L, 2R. This generation of the target toe angles $\alpha_{TL}$, $\alpha_{TR}$ is carried out mainly based on the steering angular velocity $\omega_H$ of the steering angle $\theta_H$ using toe angle tables 71a preset for each of the left and right rear wheels 2L, 2R. It is noted that the above control is carried out so that when the steering angular velocity is large, the toe angle becomes large.

In addition, the steering angular velocity $\omega_H$ is calculated by differentiating the steering angle $\theta_H$ in the target toe angle computing part 71. It is noted that this steering angular velocity $\omega_H$ indicates a direction to which a driver turns the steering wheel 3.

For example, the above parameters are set as follows:

$$\alpha_{TL} = KL * \omega_H \quad (1)$$

$$\alpha_{TR} = KR * \omega_H \quad (2)$$

Although KL and Kr are proportionality constants, they may be parameters determined by the vehicle speed V, the steering angle $\theta_H$, and the steering angular velocity $\omega_H$. In addition, if necessary, the target toe angles $\alpha_{TL}$, $\alpha_{TR}$ may be calculated with reference to the steering angle $\theta_H$ and the vehicle speed V.

For clarification, suppose that when the vehicle is turning right (i.e., when the steering wheel 3 is turned right to tilt the left and right front wheels 1L, 1R to the right), the steering angle $\theta_H$ is greater than $\theta_0$ ($\theta_H > \theta_0$) (where $\theta_0$ is a positive very small value), and when the vehicle is turning left (i.e., when the steering wheel 3 is turned left to tilt the left and right front wheels 1L, 1R to the left), the steering angle $\theta_H$ is less than $-\theta_0$ ($\theta_H < -\theta_0$).

Further, suppose that when the present toe angles $\alpha_L$, $\alpha_R$ (described below) for each of the target toe angles $\alpha_{TL}$, $\alpha_{TR}$, and the left and right rear wheels 2L, 2R are toe-in, $\alpha_{TL}$, $\alpha_L$, $\alpha_{TR}$, and $\alpha_R$ are greater than $\alpha_0$ ($\alpha_{TL}$, $\alpha_L$, $\alpha_{TR}$, $\alpha_R > \alpha_0$) (where $\alpha_0$ is a positive very small value). Accordingly, the left rear wheel 2L (where $\alpha_L > \alpha_0$) is tilted to the right with respect to a traveling direction of the vehicle, and the right rear wheel 2R (where $\alpha_R > \alpha_0$) is tilted to the left with respect to the traveling direction of the vehicle.

Still further, when the steering wheel 3 is being turned right at a given speed, a steering angular velocity $\omega_H$ is greater than $\omega_0$ ($\omega_H > \omega_0$) (where $\omega_0$ is a positive very small value), and the steering wheel 3 is being turned left at a given speed, the steering angular velocity $\omega_H$ is less than $-\omega_0$ ($\omega_H < -\omega_0$).

(Toe Angle Change Control ECU)

Figure 6:
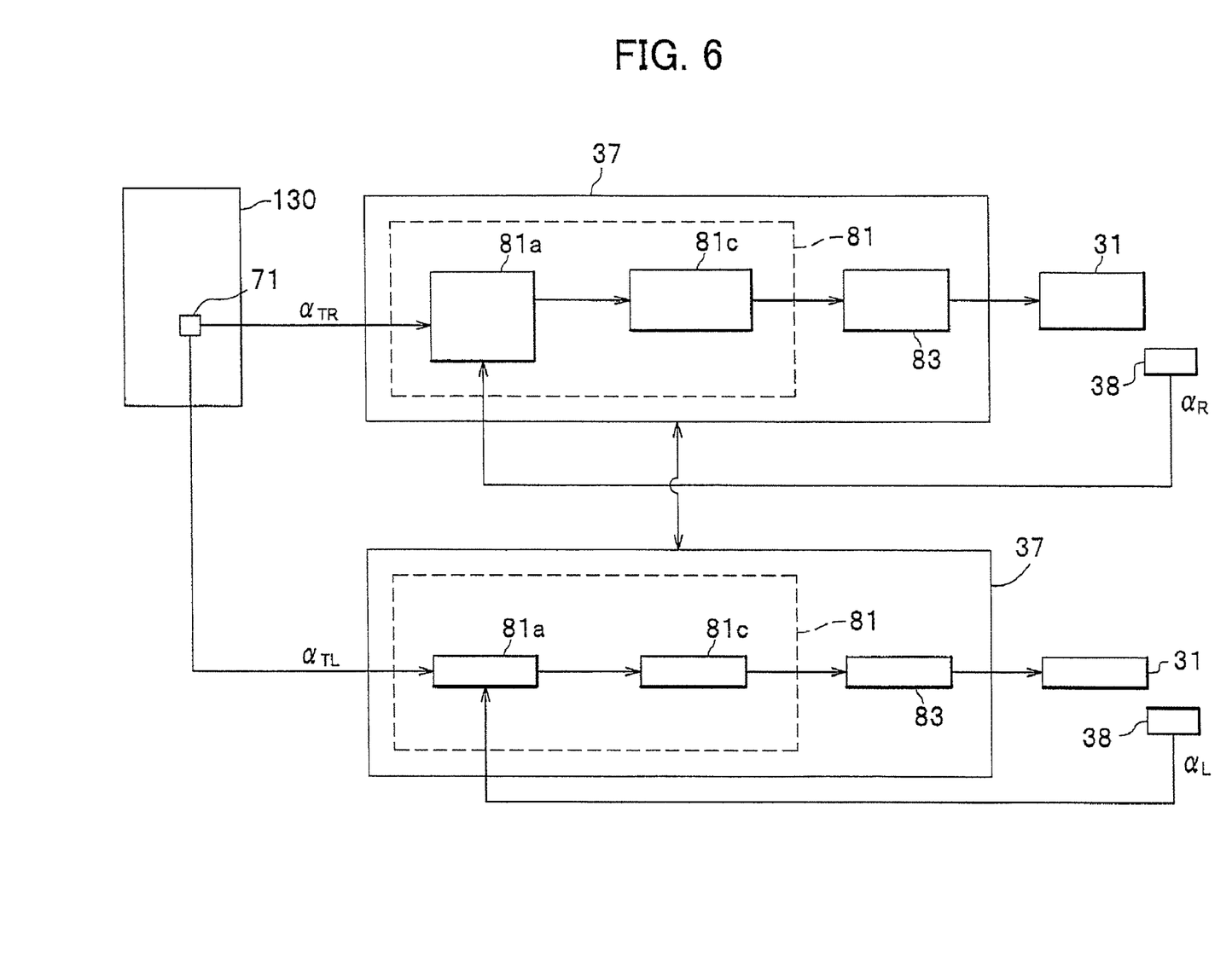
FIG. 6 is a block diagram of a toe angle change control ECU of a toe angle changer.

Next, the detailed configuration of the toe angle change control ECU will be described with reference to FIG. 6. FIG. 6 is a block configuration diagram showing a control function of a toe angle change control ECU of a toe angle changer.

As shown in FIG. 6, the toe angle change control ECU 37 has a function to drive control the actuator 30 (i.e., the electric motor 31), and is formed of a control part 81 and an electric motor drive circuit 83. Each toe angle change control ECU 37 is connected to the steering control ECU 130 through a communication line, and also to the other toe angle change control ECU 37 through a communication line.

The control part 81 includes a microcomputer with components, such as CPU, RAM, ROM, and a peripheral circuit, and has a target current calculating part 81a, and a motor control signal generation part 81c.

The target current calculating part 81a of one toe angle change control ECU 37 (on a right rear wheel 2R side) is configured to calculate a target current signal based on a deviation of the target toe angle $\alpha_{TR}$ (a target value according to a steering angular velocity) of the right rear wheel 2R input through the communication line from the steering control ECU 130, and present toe angle $\alpha_R$ (a target value according to a steering angular velocity) of the right rear wheel 2R obtained from the stroke sensor 38, and to output the result to the motor control signal generation part 81c.

The target current calculating part 81a of the other toe angle change control ECU 37 (on a left rear wheel 2L side) is configured to calculate a target current signal based on a deviation of the target toe angle $\alpha_{TL}$ of the left rear wheel 2L input through the communication line from the steering control ECU 130, and the present toe angle $\alpha_L$ of the left rear wheel 2L obtained from the stroke sensor 38, and to output the result to the motor control signal generation part 81c. It is noted that when the deviation is large, the target current becomes large.

Herein, the target current signal is a current signal required for setting the actuator 30 so as to realize a desired operation amount of the actuator 30 (amount of expansion/contraction of the actuator 30 that allows the rear wheel 2L (or 2R) to have a desired toe angle $\alpha_{TL}$ (or $\alpha_{TR}$)) at a desired speed.

In this manner, the target toe angle is set and controlled at the desired toe angular velocity in the target current calculating part 81a, by feeding back the present toe angle to the target toe angle so as to correct the target current signal, and by feeding back a change in the current value required for the steering wheel turn of the rear wheel 2L (or 2R) which change is caused by the vehicle speed V, road conditions, motional states of the vehicle, wear status of tire, or the like.

The motor control signal generation part 81c is configured to receive the target current signal from the target current calculating part 81a, and to output the motor control signal to the electric motor drive circuit 83. The motor control signal includes a value of the current to be supplied to the electric motor 31, and a direction of the current. The electric motor drive circuit 83 is formed of, for example, a bridge circuit with FET (Field Effect Transistor), and configured to supply an electric motor current to the electric motor 31, based on the motor control signal.

<Procedural Operation>

Figure 7:
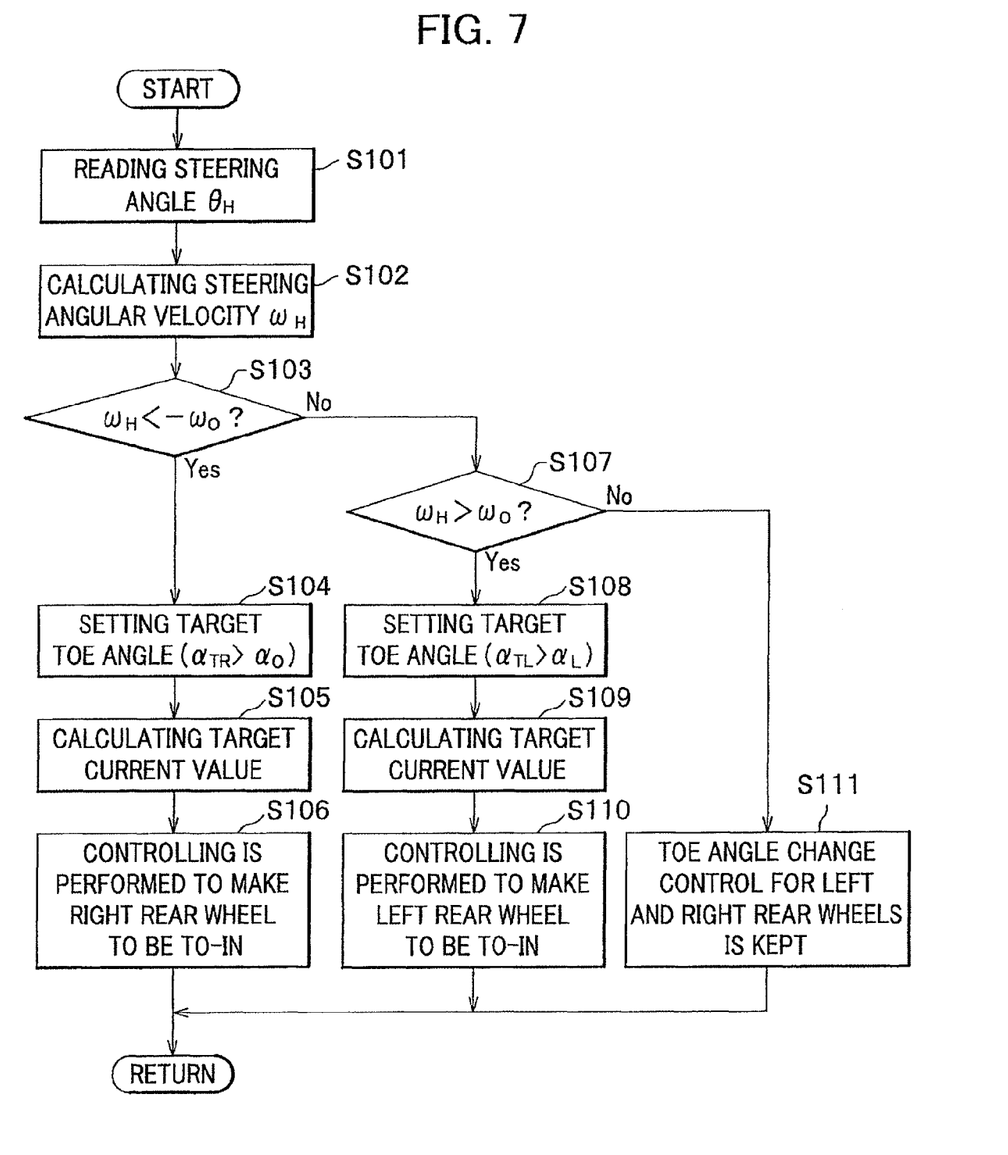
FIG. 7 is a flowchart showing a procedural operation for controlling change in toe angles in a steering system.

Next, a procedural operation for controlling change in toe angles in the steering system 100 will be described with reference to FIG. 7. FIG. 7 is a flowchart showing a procedural operation for controlling change in toe angles in the steering system. For example, suppose that the following control flow is repeated in a given cycle (1 millisecond).

First, in step S101, the target toe angle computing part 71 reads the steering angle $\theta_H$. Next, in step S102, the target toe angle computing part 71 differentiates the steering angle $\theta_H$ to calculate the steering angular velocity $\omega_H$.

In step S103, the target toe angle computing part 71 evaluates the calculated steering angular velocity $\omega_H$ to determine a direction to which the steering wheel 3 is turned. When the steering angular velocity $\omega_H$ is less than $-\omega_0$ ("Yes" in step S103), the steering wheel 3 is determined to be turned left, the control flow proceeds to step S104. The steering angular velocity $\omega_H$ is greater than or equal to $-\omega_0$ ("No" in step S103), and the control flow proceeds to step S107.

In step S104, the target toe angle computing part 71 sets $\alpha_{TR}$, which is greater than $\alpha_0$, as a target toe angle of the right rear wheel 2R using a toe angle table 71a. The $\alpha_{TR}$ is output to the toe angle change control ECU 37, and the control flow proceeds to step S105.

In step S105, the target current calculating part 81a of the toe angle change control ECU 37 calculates a target current value corresponding to the output $\alpha_{TR}$. This target current value is calculated with reference to a table prestored in a ROM. After that, in step S106, the electric motor 31 is driven based on the calculated target current value, and is controlled so that the right rear wheel 2R becomes toe-in. The reason why the right rear wheel 2R is controlled to be toe-in is that when the steering wheel 3 is turned left during turning right, the right rear wheel 2R functions as an outer wheel having large turning characteristics. Since the inner wheel has a light wheel load and less affects turning characteristics than the outer wheel, the inner wheel does not damage traveling stability even if it is actuated in advance.

In step S107, the target toe angle computing part 71 determines whether the steering angular velocity $\omega_H$ is greater than $\omega_0$. If the steering angular velocity $\omega_H$ is greater than $\omega_0$ ("Yes" in step S107), the steering wheel 3 is determined to be turned right, and the process proceeds to step S108. Is the steering angular velocity $\omega_H$ is not greater than $\omega_0$ ("No" in step S107), the steering wheel 3 is determined not to be turned, and the process proceeds to step S111.

In step S108, the target toe angle computing part 71 sets a $\alpha_{TL}$, which is greater than the $\alpha_L$, as a target toe angle of the left rear wheel 2L using the toe angle table 71a. The reason why the $\alpha_{TL}$ is set to be greater than the current toe angle $\alpha_L$ of the left rear wheel 2L is to reflect the driver's intention to still turn the steering wheel 3 to the right during turning right. However, if the turning characteristics are performed well, the above description does not apply. The set $\alpha_{TL}$ is output to the toe angle change control ECU 37, and the process proceeds to step S109.

In step S109, the target current calculating part 81a of the toe angle change control ECU 37 calculates a target current value corresponding to the output $\alpha_{TL}$. This target current value is calculated with reference to a table prestored in a ROM. After that, in step S110, the electric motor 31 is driven based on the calculated target current value, and is controlled so that the left rear wheel 2L becomes toe-in. The reason why the left rear wheel 2L is controlled to be toe-in is that when the steering wheel 3 is turned left during turning left, the left rear wheel 2L still functions as an outer wheel having large turning characteristics.

In step S111, the above described control to make the left and right rear wheels 2L, 2R to be toe-in is not carried out, the toe angle change control for the left and right rear wheels 2L, 2R is merely kept. The target toe angle computing part 71 sets given values $\alpha_{TR}$, $\alpha_{TL}$, which are not set to be toe-in as described above, as target toe angles of the left and right rear wheel 2L, 2R using the toe angle table 71a. The toe angle change control ECU 37 calculates target current values corresponding to the given values using the target current calculating part 81a, and drives the electric motor 31 based on the target current values.

With that, the explanation of a procedural operation for controlling change in toe angles in the steering system is completed.

<Summary>

According to the present embodiment, the following effect is achieved. That is, since the toe angles of the left and right rear wheels 2L, 2R is controlled based on the steering angular velocity $\omega_H$ (not the steering angle in the prior art) of the steering wheel 3, it is possible to improve response characteristics of a vehicle in turning traveling.

Especially, when a turning status is changed, since the steering angular velocity has been changed even if the steering angle remains unchanged at the time of turning a steering wheel, it is possible to say that response characteristics is excellent in change of the turning status. At this time, the rear wheel which is an inner wheel having small turning characteristics before the turning status is changed becomes the rear wheel which is an outer wheel having large turning characteristics after the turning status is changed, and it is possible to improve response characteristics in turning traveling of a vehicle by making the rear wheel to be toe-in quickly.

Figure 8:
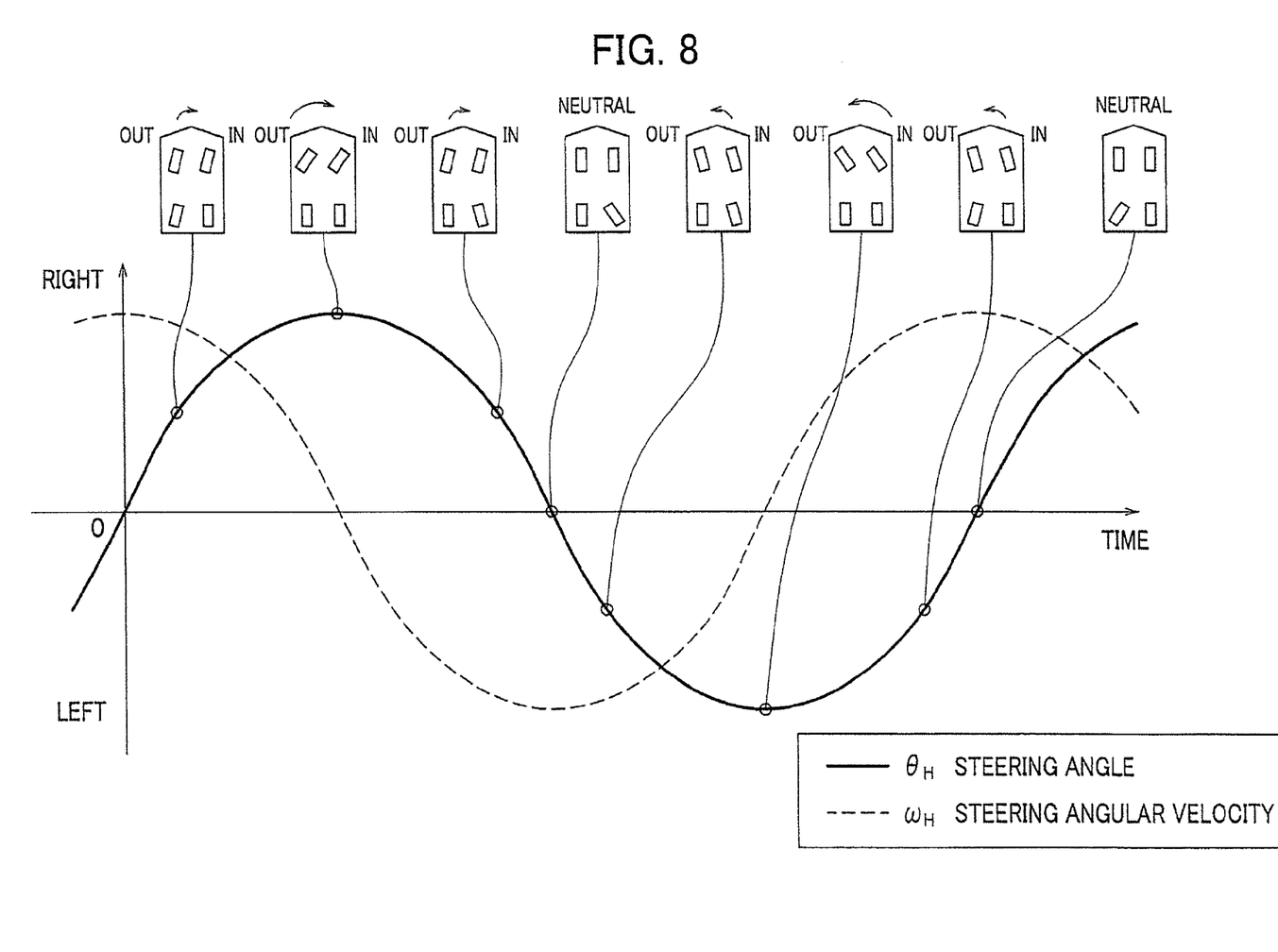
FIG. 8 shows a steering angle, a steering angular velocity, and directions of front and rear wheels of a vehicle.

FIG. 8 shows a steering angle, a steering angular velocity, and directions of front and rear wheels of a vehicle. Since the turning status of the vehicle in slalom traveling alternates between left and right, the steering angle $\theta_H$ varies as shown by a solid line in FIG. 8 over time. At this time, since the steering angular velocity $\omega_H$ varies in advance before the steering angle $\theta_H$ as shown by a dotted line in FIG. 8 over time, response characteristics is improved. As shown in FIG. 8, the steering system 100 according to the present invention is controlled to tilt the toe angle of the right rear wheel 2R to the left when the steering angular velocity $\omega_H$ is on the left side, and is controlled to tilt the toe angle of the left rear wheel 2L to the left when the steering angular velocity $\omega_H$ is on the right side. And, the toe angle controlled as described above is in accordance with the magnitude of the steering angular velocity $\omega_H$.

<Others>

In addition, although the above described configuration is best for carrying out the present invention, the embodiment of the present invention is not limited to the above described embodiments. Therefore, it will be clear that variations in the details of the embodiment specifically illustrated and described, may be made without departing from the true spirit and scope of the invention as defined in the appended claims.

For example, although the target toe angle is set (to be toe-in) based on the steering angular velocity $\omega_H$ in the above configuration, the target toe angle may be set based on a vehicle speed V, or a steering angle $\theta_H$, etc.

When the vehicle speed V is in the range of given low speed, it is desirable to set the target toe angles $\alpha_{TL}$, $\alpha_{TR}$ for each of the rear wheels 2L, 2R to facilitate small turning of the rear wheels 2L, 2R in anti-phase according to the steering angular velocity $\omega_H$ of the steering wheel 3. In the region of high speed over the given low speed, when the steering angle $\theta_H$ is within a left and right given region, it is desirable to set the target toe angles $\alpha_{TL}$, $\alpha_{TR}$ for each of the rear wheels 2L, 2R to be in-phase in accordance with the steering angular velocity $\omega_H$. That is, the target toe angles $\alpha_{TL}$, $\alpha_{TR}$ for each of the rear wheels 2L, 2R are set to make a slide slip angle $\beta$ in lane change to be small. However, in the region of high speed over the given low speed, when the steering angle $\theta_H$ is out of the left and right given region, it is desirable to set the target toe angles $\alpha_{TL}$, $\alpha_{TR}$ for each of the rear wheels 2L, 2R in accordance with the steering angular velocity $\omega_H$ to make the outer wheel of the rear wheel to be toe-in.

In addition, the target toe angles $\alpha_{TL}$, $\alpha_{TR}$ generated in the target toe angle computing part 71 need not always obey Ackermann steering geometry from the viewpoint of turning stability.

Also, in the above configuration, to promote the turning status, even if the steering wheel 3 is turned (for example, the steering wheel 3 is further turned to the right during turning right), the outer wheel of the rear wheel is controlled to be toe-in. However, if the turning stability is impaired by such control, it is desirable to provide an executable maximum value of the toe angle, and to control the outer wheel of the rear wheel not to set the target toe angle over the maximum value.

Also, instead of the steering angle $\theta_H$, the turning status may be determined based on a steering angle $\delta$ of the front wheel. In this case, a sensor for detecting the steering angle of the front wheel may be provided on an actuator for controlling steering of the front wheel, and the target current value may be calculated in the target current calculating part 81a using the steering angle $\delta$ of the front wheel. In order to determine the status of turning, a lateral acceleration sensor $S_{GS}$ or a yaw rate sensor $S_Y$ may be provided to determine that the vehicle does not go straight when a lateral acceleration or a yaw rate which is over a given value is detected.

Also, in the above embodiment, although a current supplied to the electric motor 31 is controlled by setting the target current, the current supplied to the electric motor 31 may be controlled by setting a target voltage applied to the electric motor 31.

Also, in the above embodiment, each of the left and right toe angle changers 120L, 120R has a separated toe angle change control ECU 37, or is provided independently of the steering control ECU 130, but is not limited thereto. For example, one CPU may be used instead of the above three ECUs, or may be used instead of the above two toe angle change control ECUs 37.

Also, in the above embodiment, although the vehicle speed is calculated using the vehicle speed sensor $S_V$, wheel speed sensors provided for the left and right front wheels 1L, 1R, and the rear wheels 2L, 2R may be used.

What is claimed is:

1. In a steering system for controlling toe angles of left and right rear wheels independently, comprising:
    an electric power steering device having an electric motor, which is configured to assist steering of left and right front wheels by a steering wheel;
    toe angle changers configured to independently change toe angles of the rear wheels by respective actuators in accordance with a steering angle of the steering wheel and a vehicle speed;
    a steering controller configured to control the electric power steering device and the toe angle changers;
    a steering angle sensor; and
    a vehicle speed sensor, wherein a steering angular velocity is calculated to indicate a direction to which the steering wheel is turned and to tilt the toe angle of the right rear wheel to the left when the steering wheel is determined to be turned left, and to tilt the toe angle of the left rear wheel to the right when the steering wheel is determined to be turned right.

2. The steering system according to claim 1, wherein the toe angle is proportional to the steering angular velocity.

3. In the steering system of claim 1 for controlling toe angles of left and right rear wheels independently,
    wherein a steering angular velocity is calculated to tilt the toe angle of only the right rear wheel to the left when the steering wheel is determined to be turned left, and to tilt the toe angle of only the left rear wheel to the right when the steering wheel is determined to be turned right.

4. The steering system according to claim 1, wherein the steering wheel is determined to be turned left when the steering angular velocity is less than a first given value, and the steering wheel is determined to be turned right when the steering angular velocity is greater a second given value.

* * * * *